United States Patent [19]

Gaona et al.

[11] Patent Number: 5,003,789
[45] Date of Patent: Apr. 2, 1991

[54] MIST AIR CONDITIONER FOR EVAPORATIVE COOLER

[76] Inventors: Manuel Gaona, 6509 S. 28th St.; Stephen M. Gaona, 6509 S. 28th St., both of Phoenix, Ariz. 85040

[21] Appl. No.: 487,154

[22] Filed: Mar. 1, 1990

[51] Int. Cl.$^5$ .............................. F28D 5/00
[52] U.S. Cl. ........................ 62/304; 62/311; 62/305; 261/35; 261/25; 261/88
[58] Field of Search ............... 62/304, 305, 311; 261/153, 154, 35, 88, 100, 25

[56] References Cited

U.S. PATENT DOCUMENTS

| | | | |
|---|---|---|---|
| 2,566,319 | 9/1951 | Deacon | 261/35 |
| 3,800,553 | 4/1974 | Engalitcheff, Jr. | 62/310 |
| 4,028,440 | 6/1977 | Engalitcheff, Jr. | 261/23 |
| 4,028,806 | 6/1977 | Gingold et al. | 62/183 |
| 4,031,710 | 6/1977 | Rideout | 62/171 |
| 4,204,409 | 5/1980 | Satama | 62/305 |
| 4,266,406 | 5/1981 | Ellis | 62/183 |
| 4,381,817 | 5/1983 | Brigida et al. | 165/110 |
| 4,576,012 | 3/1986 | Luzenberg | 62/157 |

FOREIGN PATENT DOCUMENTS 55-72689  5/1980  Japan .................................. 261/88

Primary Examiner—Henry A. Bennett
Assistant Examiner—John Sollecito
Attorney, Agent, or Firm—Warren F. B. Lindsley

[57] ABSTRACT

A precooler for enhancing the cooling effectiveness and efficiency of an existing evaporative cooling system employing a misting system for precooling the ambient air before entering the air flow inlet to the evaporative cooler.

13 Claims, 3 Drawing Sheets

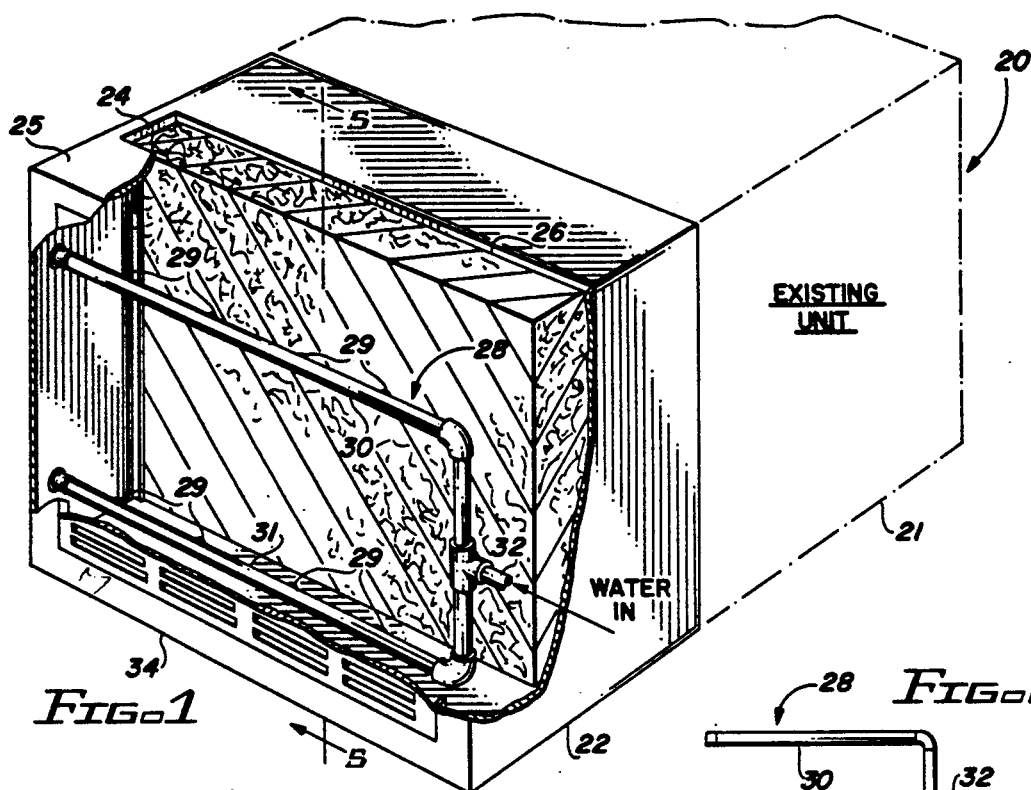
FIG. 1
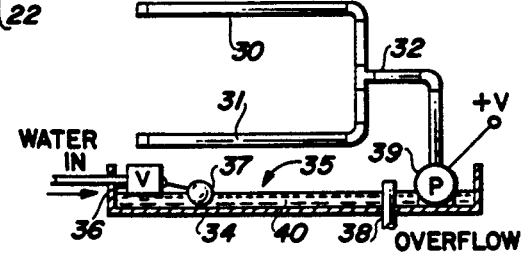
FIG. 2
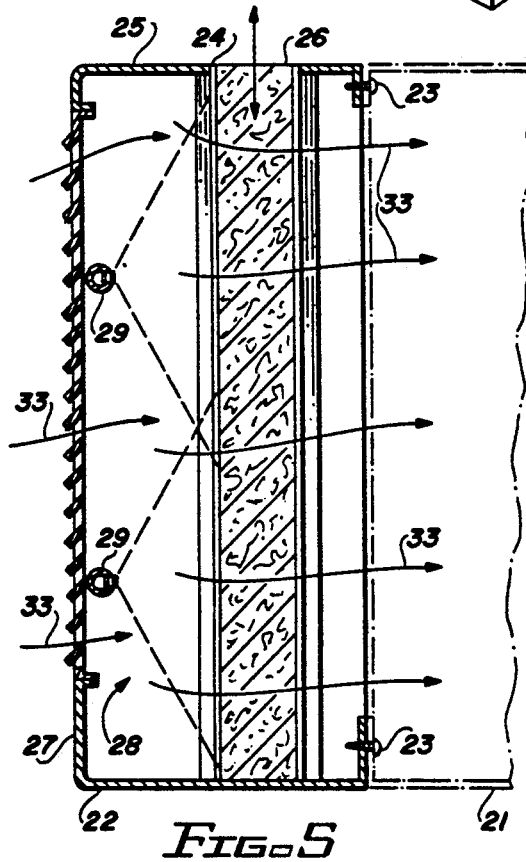
FIG. 5
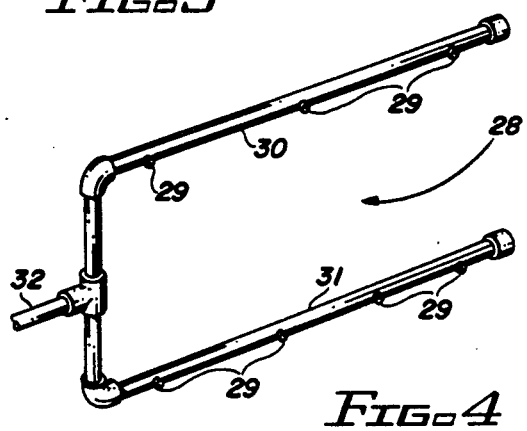
FIG. 3
FIG. 4

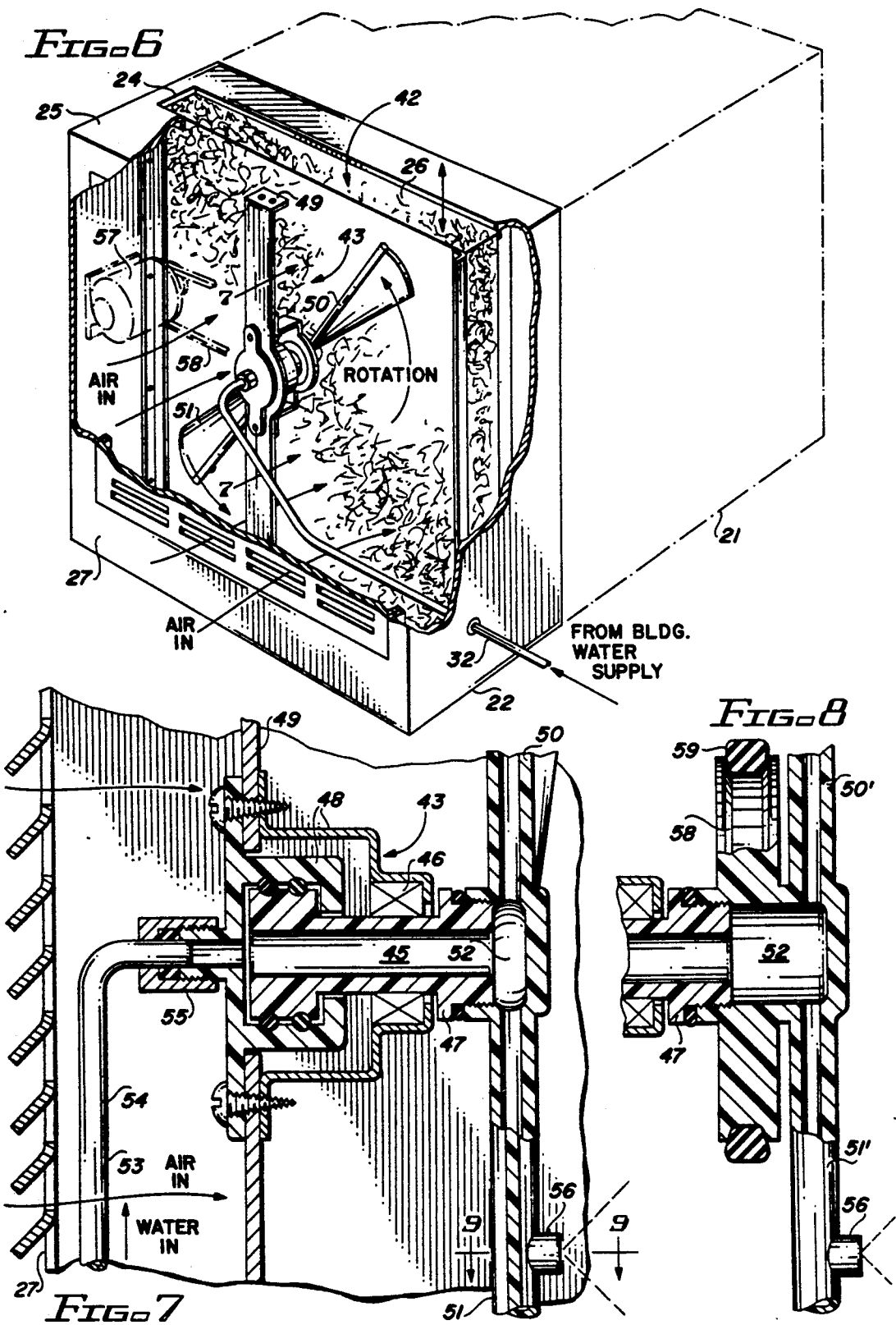

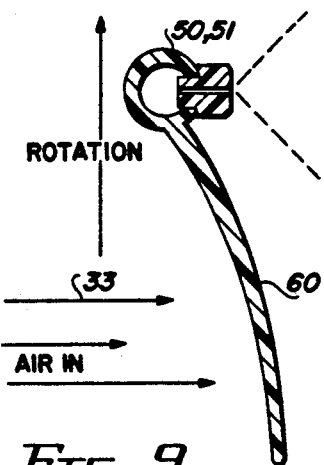
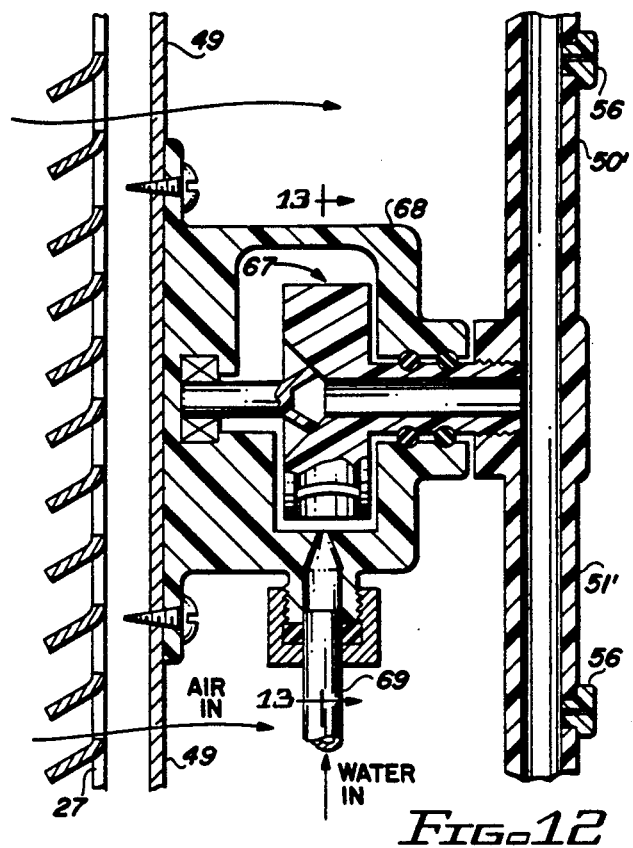
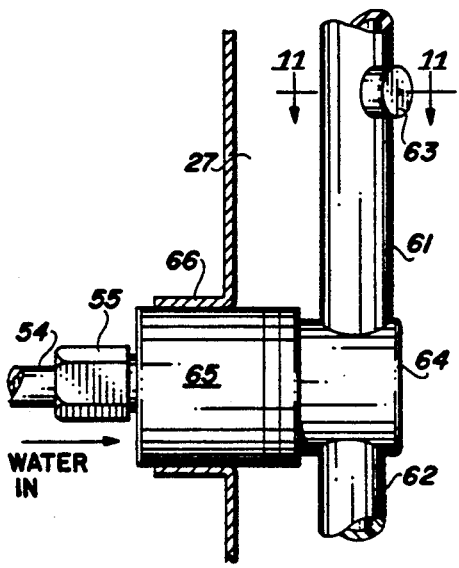
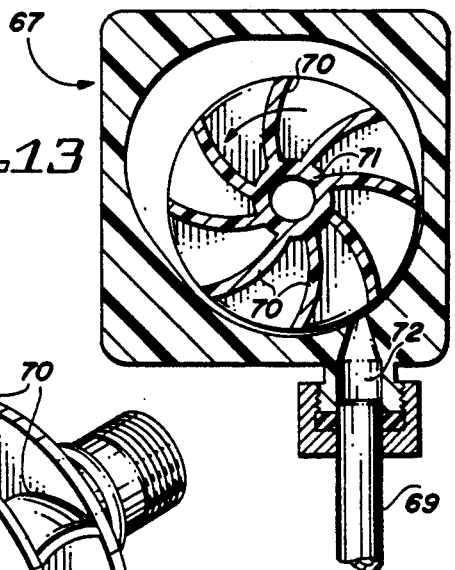
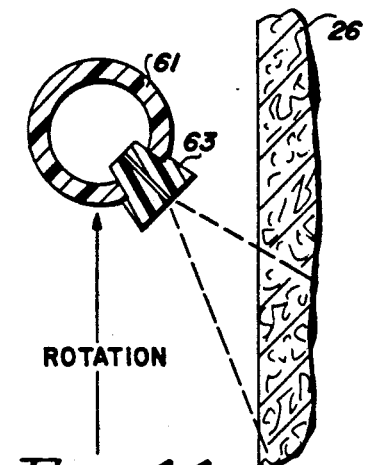
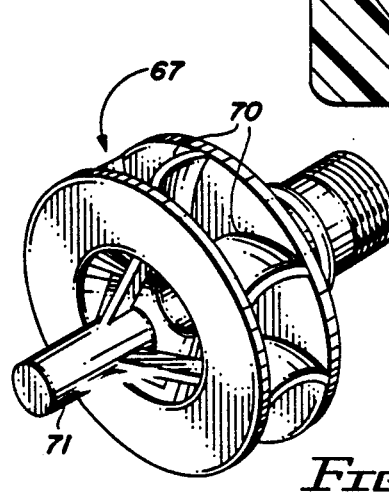

MIST AIR CONDITIONER FOR EVAPORATIVE COOLER

BACKGROUND OF THE INVENTION

With the advent of higher energy costs, the evaporative cooler as an air conditioning system is again assuming prominence in the marketplace. Its installation and operating costs are more economical than a refrigeration unit and even where a refrigeration system is needed, the trend is not to utilize both types working together to provide an air conditioning system.

While the cost of operating an evaporative cooling system is considerably less expensive than that of a mechanical refrigeration system incorporating compressors and condensers, further improvements in the effectiveness and efficiency of the evaporative cooler are economically desirable. The present invention provides a means for enhancing the cooling efficiency of an existing evaporative cooler, the means comprising a plurality of mist emitting nozzles positioned in the air intake section of the existing cooler. The mist is used to cool the air prior to passing through the evaporative pads into the evaporative cooler structure.

DESCRIPTION OF THE PRIOR ART

Numerous improvements in evaporative coolers have been conceived; however, more are needed for it to function effectively under all operating conditions and competitively with refrigeration systems.

U.S. Pat. Nos. 3,800,553; 4,028,440; 4,266,406 and 4,381,817 disclose condensers with spray nozzles positioned in the air intake path.

U.S. Pat. No. 4,028,906 discloses a fogging device for cooling a condenser coil.

U.S. Pat. No. 4,576,012 discloses an evaporative cooler having spray nozzles for sending a cooling water spray to the heat exchanger.

U.S. Pat. No. 4,031,710 discloses a manifold exterior of a tank to cool the condenser by evaporation.

None of these patents disclose the use of a misting arrangement with an evaporative cooler. Further, the disclosed invention offers important improvements in form over the above patented structures and result in a more practical and commercially acceptable product.

SUMMARY OF THE INVENTION

In accordance with the invention claimed, an evaporative cooler is provided with a new and improved misting arrangement for enhancement of the operation of existing evaporative cooling systems. The present evaporative cooler comprises a framework carrying one or more evaporator pads with provisions for water distribution to the pads. The disclosed invention provides a misting function for cooling the air entering into the evaporative cooler pad assembly.

It is, therefore, an object of the present invention to provide an improved evaporative cooling system.

Another object of the invention is to provide an auxiliary evaporative misting system that may be placed in front of an existing evaporative cooler pad to improve the operating effectiveness and efficiency of the cooling system.

A further object of the invention is to provide such an evaporative cooler misting system in a form that provides for maximum common useage of water and air handling components already present in the existing evaporative cooling unit.

A still further object of the invention is to provide such a misting system for an evaporative cooler which, by virtue of such common useage of water for misting and evaporative pad useage, is inexpensive in terms of its initial manufacturing cost.

A still further object of the invention is to provide such a misting system in a form which facilitates its installation with an existing cooler and which requires a minimum of additional mounting space.

A still further object of the present invention is to provide a misting system as a means for upgrading an existing evaporative cooler that has been found incapable of handling its required cooling load.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described with reference to the accompanying drawings, in which:

FIG. 1 is a perspective view showing the exterior of a conventional evaporative cooler with a misting assembly mounted in front of it;

FIG. 2 is a diagramatic illustration of a fixedly mounted water pressure arrangement for a misting system employing a sump;

FIG. 3 is a diagramatic illustration of a modification of the water pressure system shown in FIG. 2;

FIG. 4 is an enlarged view of a portion of the piping shown in FIGS. 2 and 3 illustrating one arrangement of the nozzles;

FIG. 5 is a cross sectional view of FIG. 1 taken along the line 5—5;

FIG. 6 is a perspective view of a modification of the evaporative cooler and misting system shown in FIG. 1 employing a wind activated rotating nozzle misting arrangement;

FIG. 7 is a cross sectional view of FIG. 6 taken along the line 7—7;

FIG. 8 is a cross sectional view of a modification of the rotating misting arrangement shown in FIGS. 6 and 7 wherein the rotating blades are actuated by a belt drive;

FIG. 9 is a cross sectional view of FIG. 7 taken along the line 9—9;

FIG. 10 is a modification of the misting arrangement shown in FIGS. 1, 6, 7 and 8 wherein the misting arrangement is rotated by the water jets;

FIG. 11 is a cross sectional view of FIG. 10 taken along the line 11—11;

FIG. 12 is a further modification of the misting systems shown in FIGS. 1, 6–8 and 10 wherein the rotating misting system is turbine driven;

FIG. 13 is a cross sectional view of FIG. 12 taken along the line 12—13; and

FIG. 14 is q perspective view of the turbine wheel shown in FIGS. 12 and 13.

DESCRIPTION OF THE PREFERRED EMBODIMENT

Referring more particularly to the drawings by characters of reference in FIG. 1 illustrates a conventional evaporative cooler 20 comprising a housing 21 having a single evaporator pad or assembly (not shown) formed of a porous media mounted across the air entrance way into the cooler structure. A motor drive fan or blower (not shown) is mounted in housing 21 for moving the cooled air into a ventilating system in a manner well known in the prior art.

As indicated the prior art cooler is shown with a single air entrance way into the cooler through a moist pad assembly.

Accordingly, the disclosed invention is directed to a misting assembly that is attached to the prior art housing of a known evaporative cooler whether or not the prior art evaporative cooler has been modified by changing or removing its existing single pad assembly.

As shown in FIGS. 1 and 5, the auxiliary misting assembly comprises a housing 22 which is attached to the air entrance of a prior art structure by suitable fastening means 23. Housing 22 is provided with a rectangular slot 24 in its top 25 through which a well known evaporative pad 26 is inserted and/or removed at will for cleaning purposes. This pad covers the entranceway into the prior art evaporative cooler 20.

The housing 22 further comprises a louvered front panel 27 forming an air entranceway into housing 22.

As noted from FIGS. 1, 2, 4 and 5, a misting assembly 28 is mounted between and parallel with the louvered front panel 27 and pad 26. This assembly comprises a rectangular piping arrangement having nozzles 29 spacedly positioned along its legs 30 and 31 and directed toward pad 26 so as to essentially cover the pad with a water mist when water under pressure is connected to inlet 32 from a suitable source.

Thus, when water under pressure is applied to inlet 32 a water mist is generated by nozzles 29 which spray covers the exposed surface of pad 26. Air, shown by arrows 33 passing through pad 26 into the evaporative cooler 20 is cooled before entering the cooler.

FIG. 2 diagramatically illustrates that the bottom 34 of housing 22 may define a sump 35 for receiving any moisture that condenses into water from the effects of misting the exposed surface of pad 26. In a known manner the sump is kept full to a given level by water flow under pressure into the sump through a valve 36 having a known float control. An overflow pipe 38 aids in maintaining a desired water level in sump 35. A pump 39 when energized pumps the sump water 40 through inlet 32 to the misting assembly 28.

FIG. 3 illustrates a modification of the misting system shown in FIG. 2 wherein like parts are given the same reference characters. In FIG. 3 water under pressure flows through an electrically energized valving arrangement 41 directly to the misting assembly 28 without first entering sump 35.

FIGS. 6 and 7 illustrate a modification of the misting assembly shown in FIGS. 1-5 wherein like parts are given the same reference characters. The misting assembly 42 of FIGS. 6 and 7 differs from that shown in FIGS. 1-5 by the rotating means 43 on which the misting nozzles 44 are mounted.

As shown in FIGS. 6 and 7, a rotating shaft 45 is journaled in bearing 46 internally of a housing assembly 48 which is suitably attached to a supporting bracket 49 attached internally to the top and bottom of housing 22.

Shaft 45 is fixedly attached to a propeller like pair of hollow arms or blades 50 and 51 which are fixedly attached to a hub 52 which is threadedly attached to shaft 45 for rotation therewith.

Water under pressure flows from inlet 53, through pipe 54, compression filling or coupling 55, the hollow interior of shaft 45, through hub 52 along the hollow interior of blades 50 and 51 to nozzles 56. Nozzles 56 are so designed that they spray the entire exposed pad surface upon rotation thereof. In FIGS. 6 and 7, rotation may occur by air input through the louvers of panel 27 and housing 22, under the influence of the blower in evaporative cooler 21. Further, rotation may be aided by the design of the nozzles causing the exit of the mist from the nozzle to cause rotation of the blades.

FIG. 8 illustrates a modification of rotation means 43 shown in FIGS. 6 and 7 wherein shaft 45 and hub 52 together with blades 50' and 51' are rotated by an electric motor 57, pulley 58 and belt drive 59 shown in phantom in FIG. 6 and the belt drive 59 in full lines in FIG. 8.

FIG. 9 illustrates in more detail the structure of blades 50 and 51 of FIGS. 6 and 7 showing a vane 60 extending along and laterally of each of the blades and so curved as to define an impact surface for the incoming air 33 causing rotation of the blades and the associated misting system comprising the nozzles 56 as the air moves through the precooler and into the evaporative cooler.

Thus, FIGS. 6 and 7 disclose an air driven misting arrangement and FIG. 8 a motor driven misting arrangement.

FIGS. 10 and 11 disclose a jet driven misting system wherein the blades 61, 62 are jet driven, namely the water through the nozzles 63 aid in rotating the misting assembly.

As shown in FIG. 9, the rotating misting assembly comprises a shaft (not shown) connected to hub 64 which is mounted in a swivel coupling 65. Coupling 65 is fixedly contained in a flange 66 of the louvered panel 27 of housing 22.

FIG. 12 discloses a further modification of the misting arrangement shown in FIGS. 6–8 wherein like parts are given the same reference characters. In FIG. 12 the blades 50' and 51' are rotated by the action of a turbine 67 which is mounted within a housing 68 supported on support bracket 49. Turbine 67 is actuated by water under pressure through inlet pipe 69.

As shown in FIGS. 13 and 14 the known turbine comprises a plurality of curved fins or vanes 70 equally spaced about a central spindle 71 which vanes receive a jet of water under pressure from inlet nozzle 72 causing rotation of the spindle and in turn the blades 50' and 51' of the misting system.

Although but a few embodiments of the invention have been illustrated and described, it will be apparent to those skilled in the art that various changes and modifications may be made therein without departing from the spirit of the invention or from the scope of the appended claims.

What is claimed is:

1. A precooler for air flowing through an ambient air inlet of an associated evaporative cooler comprising:
    an evaporative cooler pad formed of a fibrous material,
    a manifold mounted adjacent to and parallel with an air inlet side of said pad,
    said manifold being connected to a source of water under pressure,
    at least one nozzle means in said manifold positioned for directing a spray of water in the form of a mist across the inlet side of said pad, whereby the spray of water across said inlet side of said pad precools the air entering into the inlet of an evaporative cooler when said precooler is juxtapositioned thereto.

2. The precooler set forth in claim 1 in further combination with:
   means for rotating said manifold in from of said air inlet said.

3. The precooler set forth in claim 1 wherein:
   said manifold comprises a blade pivotally mounted at its center for rotating in a plane before the inlet of the evaporative cooler.

4. The precooler set forth in claim 3 wherein:
   said blade is provided with a vane upon which air moving through the precooler impinges for rotation of said blade.

5. The precooler set forth in claim 3 wherein:
   said means comprises an electric motor for rotating said blade.

6. The precooler set forth in claim 3 wherein:
   said means comprises a water actuated turbine.

7. The precooler set forth in claim 3 wherein:
   said nozzle means comprises a plurality of nozzles spacedly mounted along the length of said blade.

8. A precooler for air flowing through an ambient air inlet of an associated evaporative cooler comprising:
   a housing for attaching across the air inlet of an evaporative cooler,
   an evaporative pad mounted in said housing and having a first surface across the inlet of the evaporative cooler,
   a manifold mounted in said housing adjacent to and a parallel with the air inlet second surface of said pad,
   said manifold being connected to a source of water under pressure and comprising a blade pivotally mounted at its center for rotating in a plane parallel with said second surface of said pad,
   at least a pair of nozzles spacedly arranged along the length of said blade for directing a mist of water across said second surface of said pad,
   whereby the mist of water precools the air passing through the evaporative pad of said precooler and into the evaporative cooler.

9. The precooler set forth in claim 8 in further combination with:
   means for rotating said manifold in front of said second surface of said pad.

10. The precooler set forth in claim 9 wherein:
    said blade is provided with a vane defining an impact surface for air flowing through the precooler for rotation of said blade.

11. The precooler set forth in claim 9 wherein:
    said means comprises an electric motor.

12. The precooler set forth in claim 9 wherein:
    said means comprises a water actuated turbine.

13. The precooler set forth in claim 9 in further combination with:
    a sump mounted in said housing below said pad for collecting any condensed mist draining from said pad.

* * * * *

UNITED STATES PATENT OFFICE
CERTIFICATE OF CORRECTION

Patent No. 5,003,789          Dated April 2, 1991

Inventor(s) MANUEL GAONA & STEPHEN GAONA

It is certified that error appears in the above-identified patent and that said Letters Patent is hereby corrected as shown below:

COLUMN 2;

Claim 2, line 3, after "in" delete "from" and substitute ---front---.

Claim 2, line 4, after "inlet", delete "said" and substitute ---side---.

Claim 8, line 8, delete "a" (second occurrence).

Signed and Sealed this

Fourth Day of August, 1992

Attest:

DOUGLAS B. COMER

Attesting Officer        Acting Commissioner of Patents and Trademarks